United States Patent

Yoshikawa et al.

[11] Patent Number: 5,982,402
[45] Date of Patent: Nov. 9, 1999

[54] APPARATUS FOR PRINTING COLOR IMAGE BY COMBINATION OF OPTICAL BEAM SCANNING UNITS AND PHOTOSENSITIVE DRUMS

[75] Inventors: Hiroyasu Yoshikawa; Shin-ya Hasegawa; Masato Nakashima; Fumio Yamagishi, all of Kawasaki, Japan

[73] Assignee: Fujitsu Limited, Kawasaki, Japan

[21] Appl. No.: 08/863,686

[22] Filed: May 27, 1997

Related U.S. Application Data

[63] Continuation of application No. 08/301,396, Sep. 8, 1994, abandoned.

[30] Foreign Application Priority Data

May 27, 1997 [JP] Japan ..................................... 5-312912

[51] Int. Cl.$^6$ ............................... B41J 2/385; B41J 2/47; G03G 15/01
[52] U.S. Cl. ........................................... 347/116; 347/248
[58] Field of Search .................................... 347/244, 261, 347/259, 250, 233, 134, 119, 115, 117, 129, 116; 346/107.4, 138, 44; 358/481; 250/559.29; 399/394, 301

[56] References Cited

U.S. PATENT DOCUMENTS

| | | | |
|---|---|---|---|
| 3,809,806 | 5/1974 | Walker et al. | 347/260 |
| 4,779,944 | 10/1988 | Ritter et al. | 347/134 |
| 5,264,872 | 11/1993 | Wong | 347/250 |

*Primary Examiner*—N. Le
*Assistant Examiner*—L. Anderson
*Attorney, Agent, or Firm*—Staas & Halsey LLP

[57] ABSTRACT

A tandem type color printer, having optical beam scanning units and corresponding photosensitive drums, which detects a positional shift of a scanning locus occurring on a corresponding one of the plurality of photosensitive drums, and automatically corrects the detected positional shift of the scanning locus. A detecting window, in which a beam transmission time varies with a change in the beam scanning position, is provided at each of the start end side and the terminal end side of each of a plurality of beam scanning loci in a mask plate. The mask plate is arranged between the optical beam scanning units and the photosensitive drums, to provide output of a detection signal corresponding to the incident time of the transmission beam resulting from beam scanning by a light source, and thus determines and corrects the direction and the amount of positional shift of the scanning locus.

11 Claims, 12 Drawing Sheets

APPARATUS FOR PRINTING COLOR IMAGE BY COMBINATION OF OPTICAL BEAM SCANNING UNITS AND PHOTOSENSITIVE DRUMS

This application is a continuation-in-part of application number 08/301,396, filed Sep. 8 1994, now abandoned.

BACKGROUND OF THE INVENTION

The present invention relates to a color printer printing a color image by the electronic photographing method, and more particularly, to a color printer provided with optical beam scanning units and photosensitive drums in numbers corresponding to the number of kinds of color used for color synthesis.

Recent progress of laser printers toward color printers has been remarkable, and is resulting in the emergence of low-cost compact color printers. In order to achieve a color laser printer, it is necessary to use a multiple transcription method based on a plurality of colors. Among other multiple transcription methods, there is known the tandem method, which comprises providing an optical beam scanning unit and a photosensitive drum for each color to be printed. For the YMCK system (yellow, magenta, cyanogen, and black), for example, four sets of an optical beam scanning unit and a photosensitive drum are provided. In the case of such a tandem type color laser printer, scanning lines must be created for each of the YMCK colors to be printed, and a strict color shift accuracy must be complied with: a positional accuracy of scanning line of under 100 $\mu$m is required for a resolution of 600 dpi, for example.

In a conventional tandem type color laser printer, however, the necessary positional accuracy of scanning lines for each color to be printed is maintained through adjustment upon assembling each optical beam scanning unit. As a result, an adjustment operation in the manufacturing stage requires much time and labor, thus leading to a higher cost.

Because of the use of optical beam scanning units in a number corresponding to the number of colors to be printed, a trouble, if any, in an optical beam scanning unit for a particular color, naturally requiring replacement of the troubled optical unit, requires a positioning adjustment again as in the manufacturing stage, and the difficult replacement of each optical unit has thus been a problem in the conventional tandem type color laser printer.

SUMMARY OF THE INVENTION

According to the present invention, there is provided a tandem type color printer which automates detection and correction of a positional shift of scanning lines for each color to be printed, to reduce the manufacturing cost and improve operability of maintenance.

In the present invention, beam light from sources are formed into images on a plurality of photosensitive drums by means of a plurality of optical beam scanning units to cause linear scanning. Electrostatic latent images formed by optical beam scanning on the plurality of drums are developed by the use of unique color fine particles such as color toners of Y, M, C and K, for example, then sequentially transcribed on a sheet of paper for color synthesis, and finally fixed by color-electrophotography.

In this tandem type color printer of the present invention, a positional shift a scanning locus which may be produced on the plurality of photosensitive drums is detected by means of a positional shift detecting unit, and automatically corrected through a positional shift correcting circuit.

The positional shift detecting unit has a mask plate, provided with a beam transmission window, arranged between the plurality of optical scanning units and the plurality of photosensitive drums. The mask plate has a detecting window which detects fluctuations of the transmitting time of beam light in response to fluctuations of the beam scanning position at each of the starting and terminal ends of each scanning locus of the plurality of optical scanning units. An optical sensor is provided behind the detecting window, and provides output of a detection signal corresponding to the incident time of the transmitting beam resulting from beam scanning. The direc tion and the amount of a positional shift of a scanning locus can be determined on the basis of detection signals from the starting end side optical sensor and the terminal end side optical sensor. The detecting window of the mask plate uses a triangular window, a trapezoidal window, or a pair of slits arranged at an angle relative to the scanning locus. According to any of these shapes, the opening width varies with a change in the position of the scanning locus, and it is possible to conceive a positional shift in the form of a change in the beam incident time.

The positional shift correcting circuit corrects a positional shift of the scanning locus by means of a change in the optical axis caused by displacement of the laser source or the mirror of the optical scanning unit. More specifically, it causes the laser source to move in a direction perpendicular to the optical axis, and the direction of the optical axis to change by the rotation of a mirror provided in the middle of the optical path. Piezo-electric elements are used for driving the mirror.

A reference window for detecting the reference position of starting scanning is provided before the detecting window on the start end side of the mask plate. A reference position sensor receives transmission light of each scanning beam having been transmitted through the reference window and, in response, provides a reference position signal. A start timing control circuit starts supply of a driving signal to the laser source upon the lapse of a predetermined period of time after the receipt of a reference position signal. A correcting circuit alters the time set by the start timing control circuit to align the scanning start positions of the scanning lines. A slit formed in a direction perpen dicular to the beam scanning locus serves as the reference window of the mask plate.

In the present invention, furthermore, the plurality of optical beam scanning units are releasably provided as units separate from the photosensitive drums and the mask plate to permit independent positional shift adjustment and unit replacement by means of optical beam scanning units for the individual colors to be printed.

The color printer of the present invention detects a positional shift of a scanning line for each color to be printed by using the mask plate for detecting the scanning line positional shift. In the case of a tandem type laser color printer using four photosensitive drums, scanning lines are produced independently on the photosensitive drums corresponding to individual colors to be printed, and the result of development based on latent images on a plurality of lines at a position is transcribed and fixed by the travel of a sheet of paper caused by a paper feeder mechanism. If the paper feed speed is constant in this case, a color shift upon printing is caused by a relative shift of a scanning line on the photosensitive drum for each color. The positional shift of a scanning line caused by an optical unit of each color to be printed is therefore detected by using the mask plate, arranged at each of the start and terminal end sides for each scanning line, having two detecting windows, and thus the positional shift is automatically corrected for positioning at a required accuracy.

A triangular detecting window is provided, in the mask plate, on each of the start and terminal end sides of each scanning line. Since the opening area of the triangular window varies with the position of the scanning line, it is possible to know at what position of the detecting window the scanning line has passed through from the difference in the incident time of the scanning beam. Parallelism of scanning lines can be detected by means of the two detecting windows before and after the scanning line in question. A reference window for determining a reference position for starting scanning is provided just before the positional shift detecting window on the start end side formed on the mask plate. A reference position signal issued upon receipt of the incident beam light coming in through the reference window causes a counter to begin a counting operation. When a prescribed count value is obtained after the lapse of a predetermined period of time, beam scanning by the optical beam scanning unit is started.

A shift in the beam scanning start position is corrected through adjustment of the counting time so as to align the beam start positions of the individual optical beam scanning units. By installing the mask plate and the individual optical beam scanning units at independent positions, replacement of a single optical beam scanning unit does not lead to the necessity of taking off the mask plate. It is therefore always possible to correct the scanning line position to a position determined with reference to the mask plate, and thus to always maintain the scanning lines within a prescribed range of positional shift.

The above and other objects, features, and advantages of the present invention will become more apparent from the following detailed description with reference to the drawings.

DETAILED DESCRIPTION OF THE PREFERRED EMBODIMENTS

Figure 1:
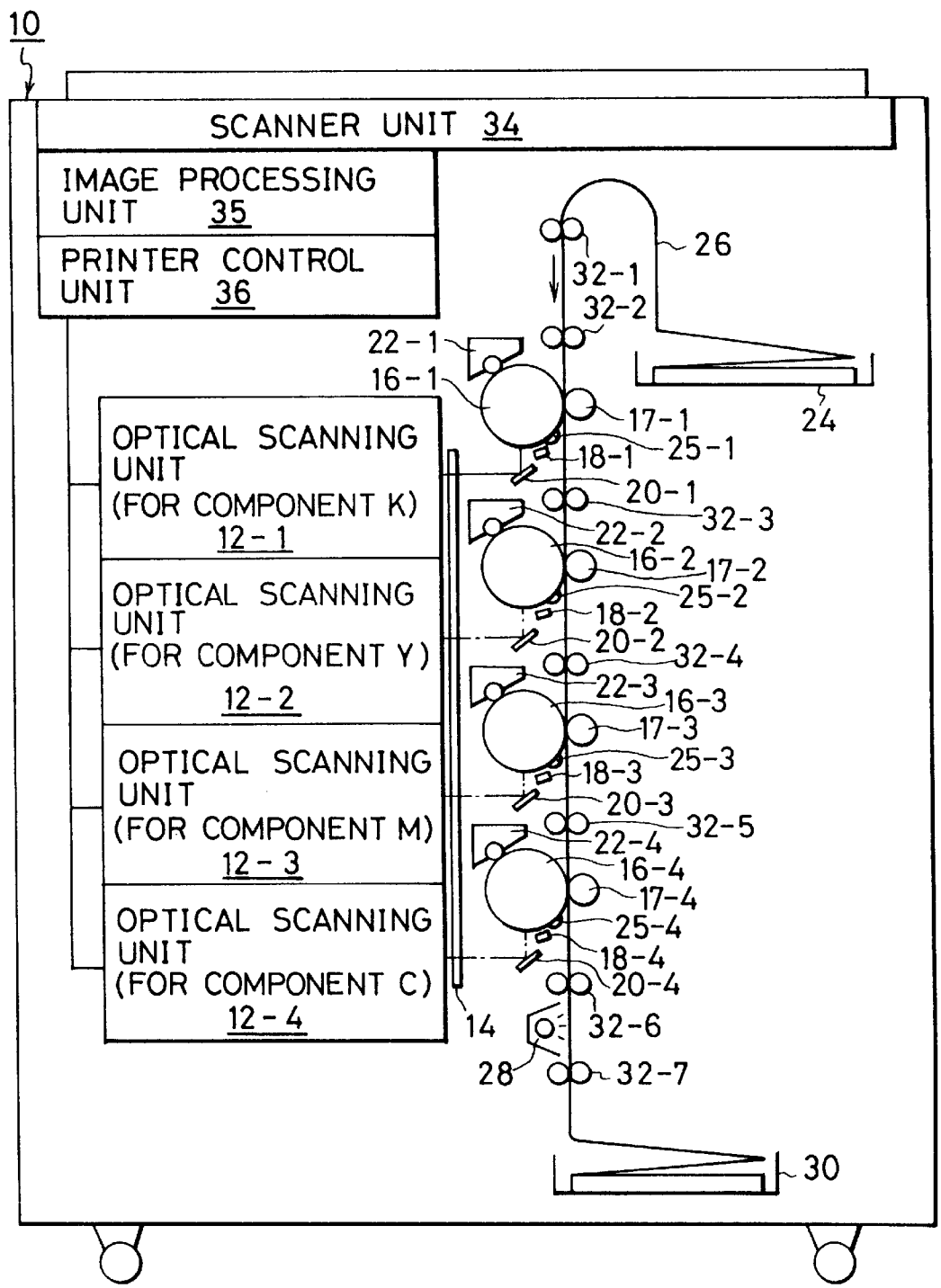
FIG. 1 is a descriptive view of the whole configuration of the present invention.

FIG. 1 is an embodiment of a color printer of the present invention. In this embodiment, a tandem type electrophotography is adopted, in which an optical unit and a drum are provided for each color for color printing through synthesis of YMCK color components.

In FIG. 1, a scanner unit 34, an image processing unit 35 and a printer control unit 36 are provided in a printer main body 10. Under the control of the printer control unit 36, there are provided optical scanning units 12-1 to 12-4 serving as printer units based on electrophotography. The optical scanning units 12-1 to 12-4 correspond to the color components Y, M, C and K. Four photosensitive drums 16-1 to 16-4 are arranged in front of the optical scanning units 12-1 to 12-4. Laser light from the optical scanning units 12-1 to 12-4 is reflected by mirrors 20-1 to 20-4 and reaches the photosensitive drums 16-1 to 16-4, and linearly scans the drum surface. A sheet of paper 26 drawn out from a hopper 24 installed on the top is fed to travel downward to the four photosensitive drums 16-1 to 16-4. The printed sheet of paper 26 is used in a stacker 30. The sheet of paper 26 is fed by rollers 32-1 to 32-7.

Taking up the uppermost photosensitive drum 16-1 as an example, an electrifier 18-1, a developing unit 22-1, a transcribing unit 17-1 and a cleaner 25-1 are provided around the photosensitive drum 16-1. The electrifier 18-1 negatively electrifies the surface of the photosensitive drum 16-1 prior to scanning the laser beam. A semiconductor laser built in the optical beam scanning unit 12-1 is driven to emit light by a video signal of the component K of the image to be printed, generated at the image processing unit 35, forms a two-dimensional electrostatic latent image by scanning the laser beam on the drum surface through the mirror 20-1. A developing unit 22-1 develops the electrostatic latent image on the drum surface by the use of toner for the component K. The developed image is finally transcribed onto the sheet of paper 26 by a transcribing unit 17-1. The same steps are followed also for the photosensitive drums 16-2 to 16-4 corresponding to the optical beam scanning units 12-2 to 12-4 for the remaining components Y, M and C: overtranscription of a developed image using a color toner for K, Y, M or C is accomplished while passing through the tandem-arranged photosensitive drums 16-1 to 16-4. A fixing unit 28 is provided at a position following the photosensitive drum 16-4 for thermal transcription of a transcribed color developed image.

The scanner unit 34 irradiates light from an illuminating light source, such as a halogen lamp, onto a color manuscript, forms the reflected light through an optical reduction unit as a photoelectrically converted image on a color CCD image sensor, and detects this image as sequential analog signals representing red, green, and blue points. These analog signals are converted into digital signals after AD conversion and shooting correction, and entered into the image processing unit 35.

The image processing unit 35 performs processing operations as a color printer such as basic image processing and image compilation, and in addition, when connected to a workstation serving as a higher-level external equipment, simultaneously conducts input-output processing between systems. Basic image processing operations of the image processing unit 35 include color signal conversion, toner generation (UCR), MTF processing and output harmonizing correction, and YMCK signals meeting the characteristics of the printer unit are generated through these operations. As a tandem type color printer as shown in FIG. 1, an Artage-8000 manufactured by Ricoh Co., Ltd. can be used, for example. In the present invention, furthermore, a novel mask member 14 is provided between the optical beam scanning units 12-1 to 12-4 and the photosensitive drums 16-1 to 16-4.

Figure 2:
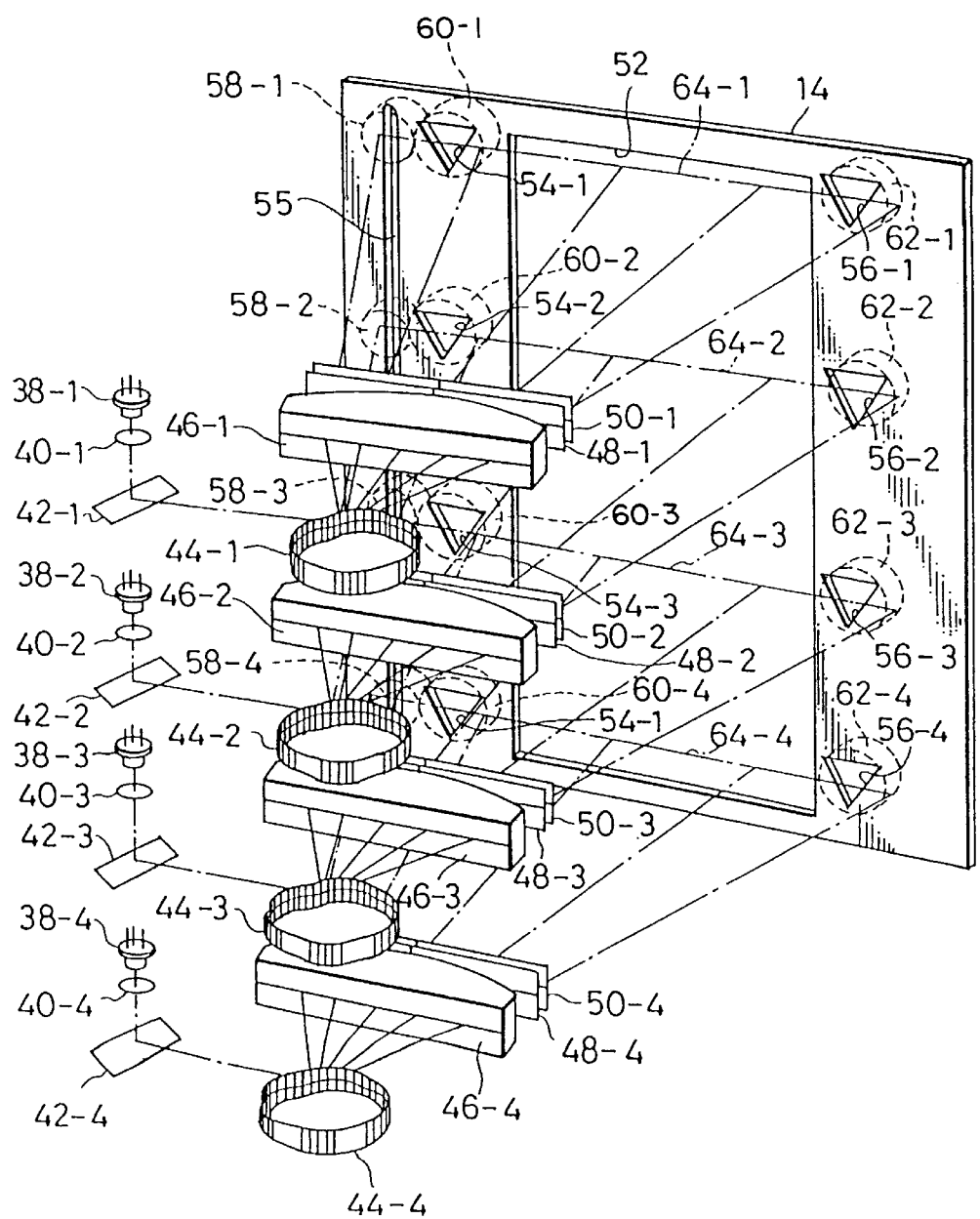
FIG. 2 is a descriptive view of the optical units shownn FIG. 1.

FIG. 2 gives details of the optical beam scanning units 12-1 to 12-4 and the mask plate 14. Discussing here the uppermost optical beam scanning unit 12-1, this unit converts the laser beam emitted from a laser diode 38-1 in the form of a spherical wave into a flat wave at a collimate lens 40-1, reflects it at a galvano-mirror 42-1, and causes the reflected beam to enter a polygonal mirror 44-1 rotating at a constant speed. The polygonal mirror 44-1 is a hexagonal polygon, for example, and the reflected beam fans out within a prescribed range along with the rotation of the mirror. The reflected beam from the polygonal mirror 44-1 passes through a θ-f lens system using a cylindrical lens 46-1, and hologram plates 48-1 and 50-1, forms a beam spot on the photosensitive drum not shown, and simultaneously causes linear scanning. More specifically, the beam reflected by the polygonal mirror 44-1 forms an image on the photosensitive drum by means of the cylindrical lens 46-1 and the hologram plates 48-1 and 50-1, and in parallel with this, isokinetic correction is performed so as to achieve a uniform speed of the beam spot on the photosensitive drum relative to a change in the beam angle θ of a uniform angular speed. As the three remaining optical beam scanning units have the same configurations, the corresponding component elements are indicated by adding numerals 2, 3 and 4 with a hyphen after the respective reference numerals.

Figure 3:
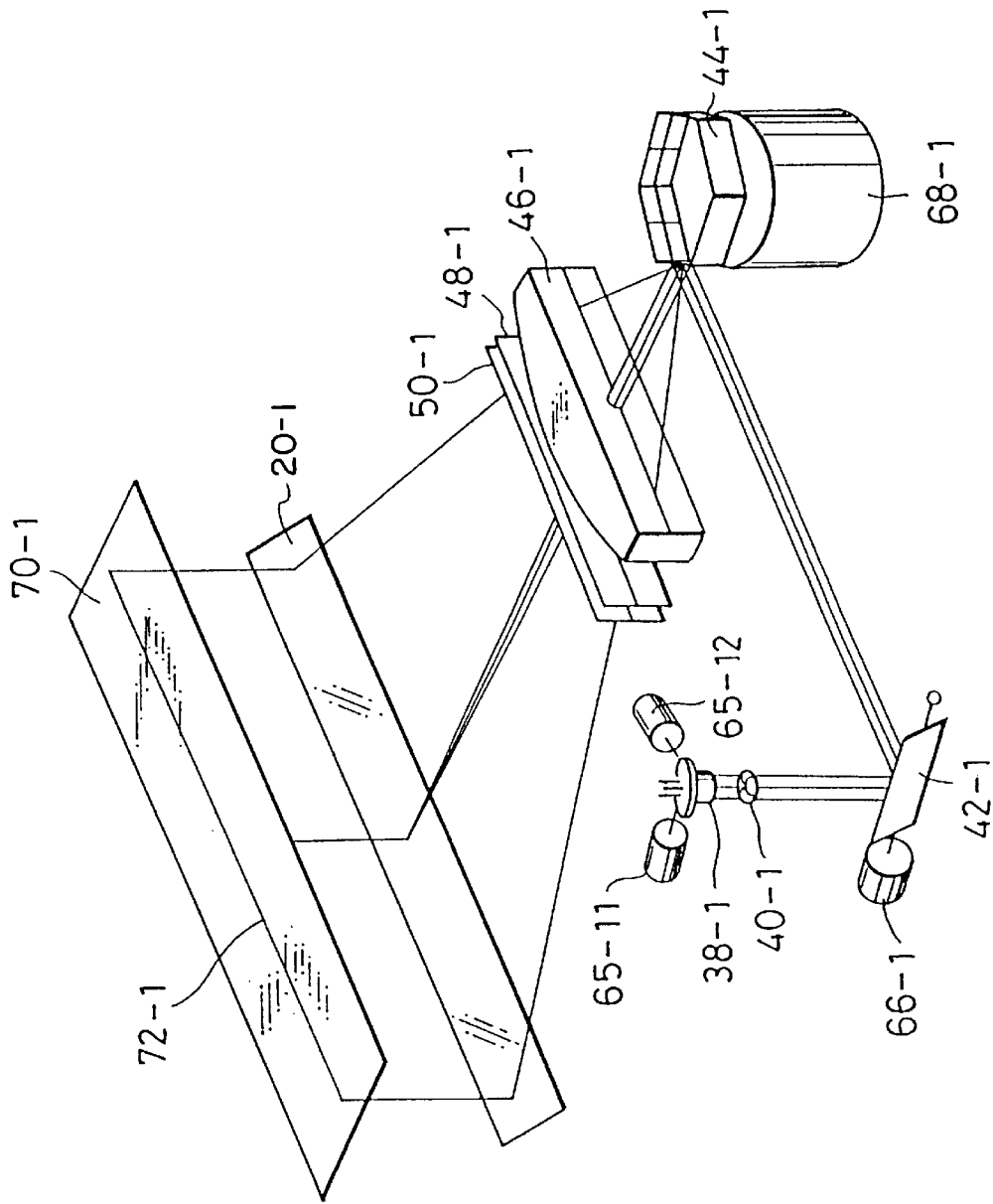
FIG. 3 is a descriptive view of a single optical unit shown FIG. 2.
Figure 4:
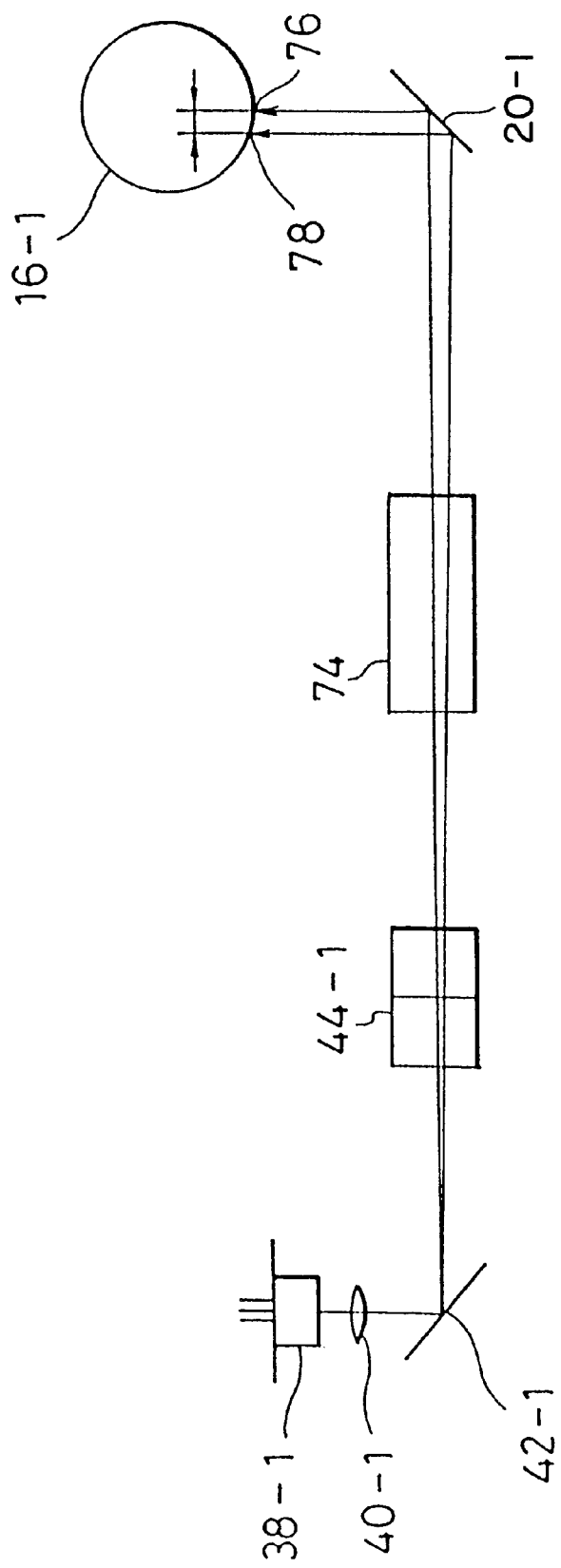
FIG. 4 is an expansion plan of a side of FIG. 3.

FIG. 3 is the uppermost optical beam scanning unit in FIG. 2, showing the semiconductor laser 38-1 and a correcting actuator provided on the galvano-mirror 42-1. FIG. 3, at the same time shows the status of scanning on the photosensitive drum side. The polygonal mirror 44-1 is rotated at a uniform speed by a spindle motor 68-1, and polarization-scans the incident beam from the galvano-mirror 42-1 within a range of a prescribed angle θ. This polarized beam is reduced in section through the θ-f lens system using the cylindrical lens 46-1 and the hologram plates 48-1 and 50-1, and simultaneously, subjected to isokinetic correction, reflected by the mirror 20-1, linearly scans the surface of the drum 70-1, a part of the photosensitive drum shown in FIG. 3, thus giving a scanning line 72-1. FIG. 4 is a linear expansion of a side of the optical beam scanning unit shown in FIG. 3.

A positional shift of the scanning line 72-1 on the drum surface 10-1 is detected by moving the semiconductor laser 38-1 in a two-dimensional plane normal to the optical axis, and rotating the galvano-mirror 42-1. Laser position driving mechanisms 65-11 and 65-12 are provided for the semiconductor laser 38-1. Motors may be used as the laser position driving mechanisms 65-11 and 65-12. The galvano-mirror 42-1 is provided with a mirror rotating mechanism 66-1. A motor may be used as the mirror rotating mechanism 66-1. However, since the amount of drive is very slight, piezoelectric elements are used, and the rotating angle of the galvano-mirror 42-1 is adjusted within a slight range by means of deflection caused by an applied voltage.

With reference to FIG. 2 again, the mask plate 14 is arranged in front of the four optical beam scanning units. The mask plate 14 has a rectangular beam transmission window 52 at its center for the scanning beam from each of the optical beam scanning units to pass through. In this mask plate 14, virtual scanning loci of beam scanning of the four optical beam scanning units are expressed with by lines 64-1 to 64-4. Taking up the scanning locus 64-1 of the uppermost optical beam scanning unit, a triangular detecting window 54-1 is provided on the start end side of the scanning locus 64-1, and an identical triangular detecting window 56-1 is provided to the right which is the terminal end side. Behind the detecting windows 54-1 and 56-1, there are installed optical sensors 60-1 and 62-1, respectively using a photodiode or a phototransistor. Parallelism of the scanning locus 64-1 can be detected by the use of these triangular detecting windows 54-1 and 56-1 and the optical sensors 60-1 and 62-1.

Further, before the detecting window 54-1 on the start end side, a vertical slit 55 is formed. Behind the path of the scanning locus 64-1 in the slit 55, an optical sensor 58-1 is provided. The slit 55 is provided for detecting a reference position for beam scanning. This optical sensor 58-1 serves as a reference position sensor. This is also the case with the scanning loci 64-2 to 64-4 for the remaining three optical beam scanning units.

Figure 5:
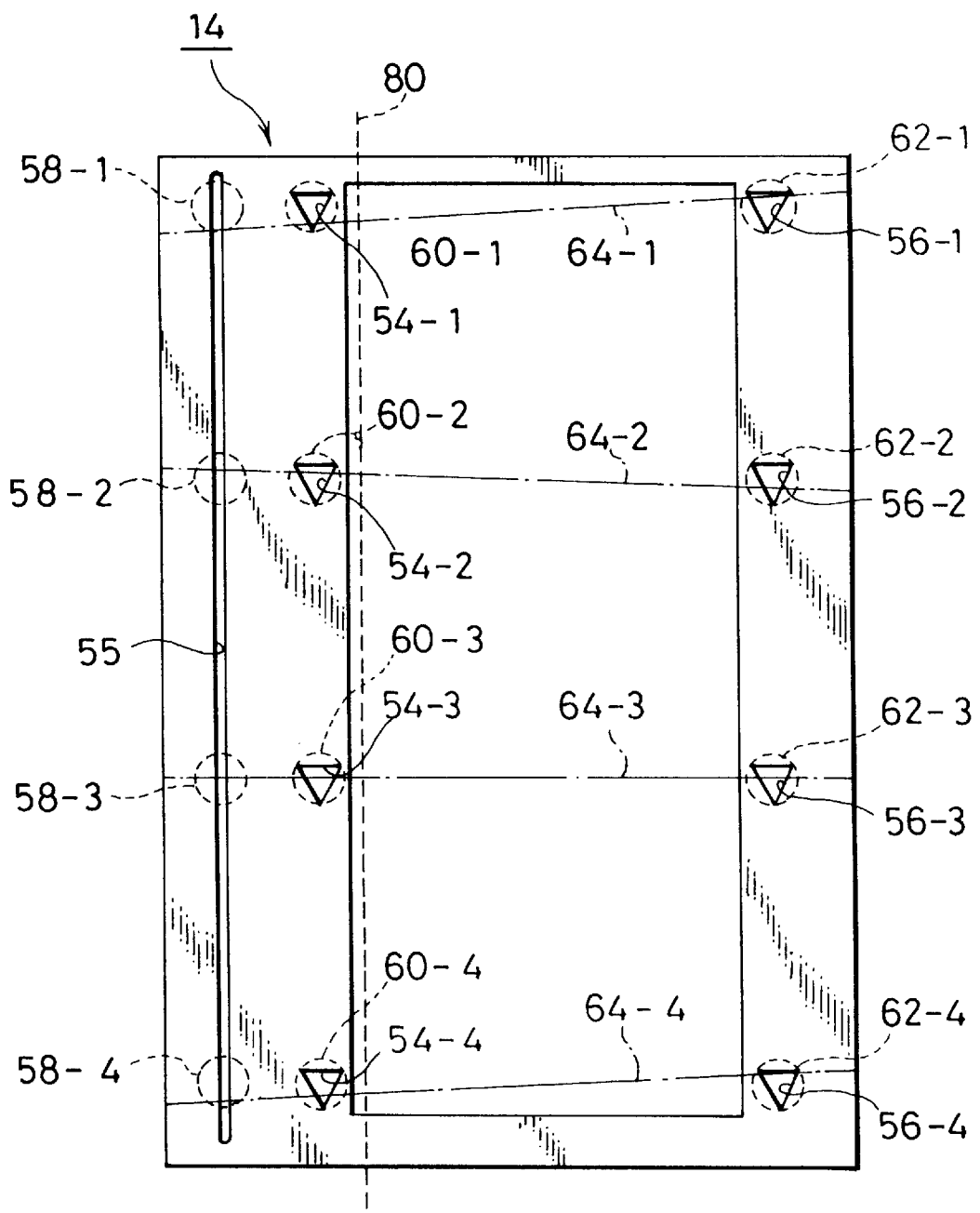
FIG. 5 is a descriptive view of the mask plate and the scanning locus of a light beam in the present invention.

FIG. 5 shows scanning loci made by the individual optical beam scanning units on the mask plate 14 shown in FIG. 2. The uppermost scanning locus 64-1 shows a right-up positional shift. The second scanning locus 64-2 shows a left-up positional shift. The third scanning locus 64-3 has no positional shift and is parallel. The lowermost scanning locus 64-4 shows a right-up positional shift.

FIGS. 6A to D show detection signals generated from light receiving signals derived from the reference position sensors 58-1 to 58-4 and the optical sensors 60-1 to 60-4 and 62-1 to 62-4 based on the scanning loci 64-1 to 64-4 of FIG. 5. As is clear from FIG. 6A corresponding to the uppermost scanning locus 64-1, there is available first a detection signal 82 from the reference position sensor 58-1, then a detection signal 84 from the optical sensor 60-1, and finally a detection signal 86 from the optical sensor 62-1. The second and third detection signals 84 and 86 correspond to the light receiving signals having passed through the triangular detecting windows 54-1 and 56-1, respectively. The scanning locus 64-1, showing a right-up positional shift, passes through the detecting window 54-1 at the lower apex of triangle, with a very short incident time, resulting in the narrow pulse-shaped detection signal 84. For the right detecting window 56-1, the scanning locus 64-1 passes near the base of triangle as a result of right-up positional shift, with a long incident time of the transmission beam, resulting in the detection signal 86 having a large pulse width. Comparison of the start end side detection signal 84 and the terminal end side detection signal 86 therefore suggests that the scanning locus shows a positional shift with the larger detection width directed upward.

Figure 6A:
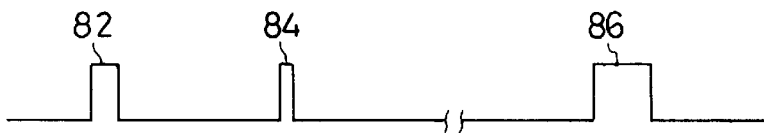
FIGS. 6A to 6D are time charts of the detection signal relative to the scanning locus shown in FIG. 5.
Figure 6B:
Figure 6C:
Figure 6D:
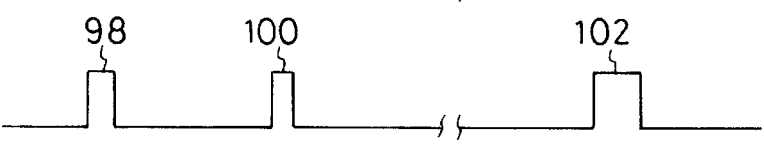

The detection signals 90 and 92 of FIG. 6B corresponding to the second scanning locus 64-2 are known to have a left-up positional shift, because the start end side detection signal 90 has a larger detection width than the terminal end side detection signal 92. For the third scanning locus 64-3, which keeps parallelism, there is an agreement in the detection width between the start end side detection signal 94 and the terminal end side detection signal 96 in FIG. 6C. In the case of the fourth right-up scanning locus 64-4, the terminal end side detection signal 102 has a larger detection width than the start end side detection signal 100 in FIG. 6D, showing a right-up positional shift as in the case of FIG. 6A.

By thus comparing detection signals of the beam having passed through the triangular detecting windows on the start end side and the terminal end side, it is possible to determine parallelism, direction of inclination and the amount of inclination of a scanning locus, and therefore possible to correct a positional shift on the basis of the detection result of this positional shift. The reference position detection signals 82, 88, 94 and 98 shown in FIGS. 6A to 6D are, on the other hand, available at the same timing from the reference position sensors 58-1 to 58-4 provided behind the slit 55 for detecting reference positions.

Figure 7A:
FIGS. 7A to 7C are time charts of beam scanning start control based on the detection signal shown in FIG. 6A.
Figure 7B:
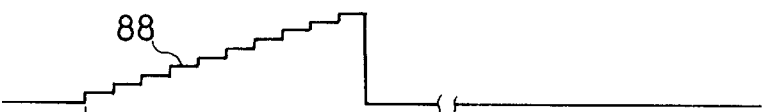
Figure 7C:
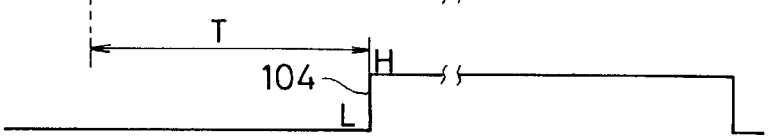

FIG. 7A, which is the same as FIG. 6A, shows a control method of start timing of a scanning beam based on the reference position detection signal 82. Upon issuance of the reference position detection signal 82 in FIG. 7A, for example, A counting operation of a counter in FIG. 7B is started. A set value corresponding to a scanning time T from the reference position to the beam scanning start position is preset in advance in the counter. The counter, having begun operation upon issuance of the position detection signal 82, increases the count value as the count value 88, and when the preset value corresponding to the scanning time T up to the reference scanning start position is reached, generates an overflow output for resetting. At the timing of this counter overflow output, the level of the video gate signal 104 in FIG. 7C is raised from level-L to level-H, and light emission drive of the semiconductor laser is started. At the same time, the video signal is supplied to perform beam scanning of the latent image to the photosensitive drum. As is clear from the control of beam scanning start timing based on the reference position detection signal shown in FIGS. 7A to 7C, if there is a shift in the beam scanning start position for the plurality of optical beam scanning units, it is possible to align all the beam start positions by correcting the shift in the start position by changing the counter preset value.

Figure 8:
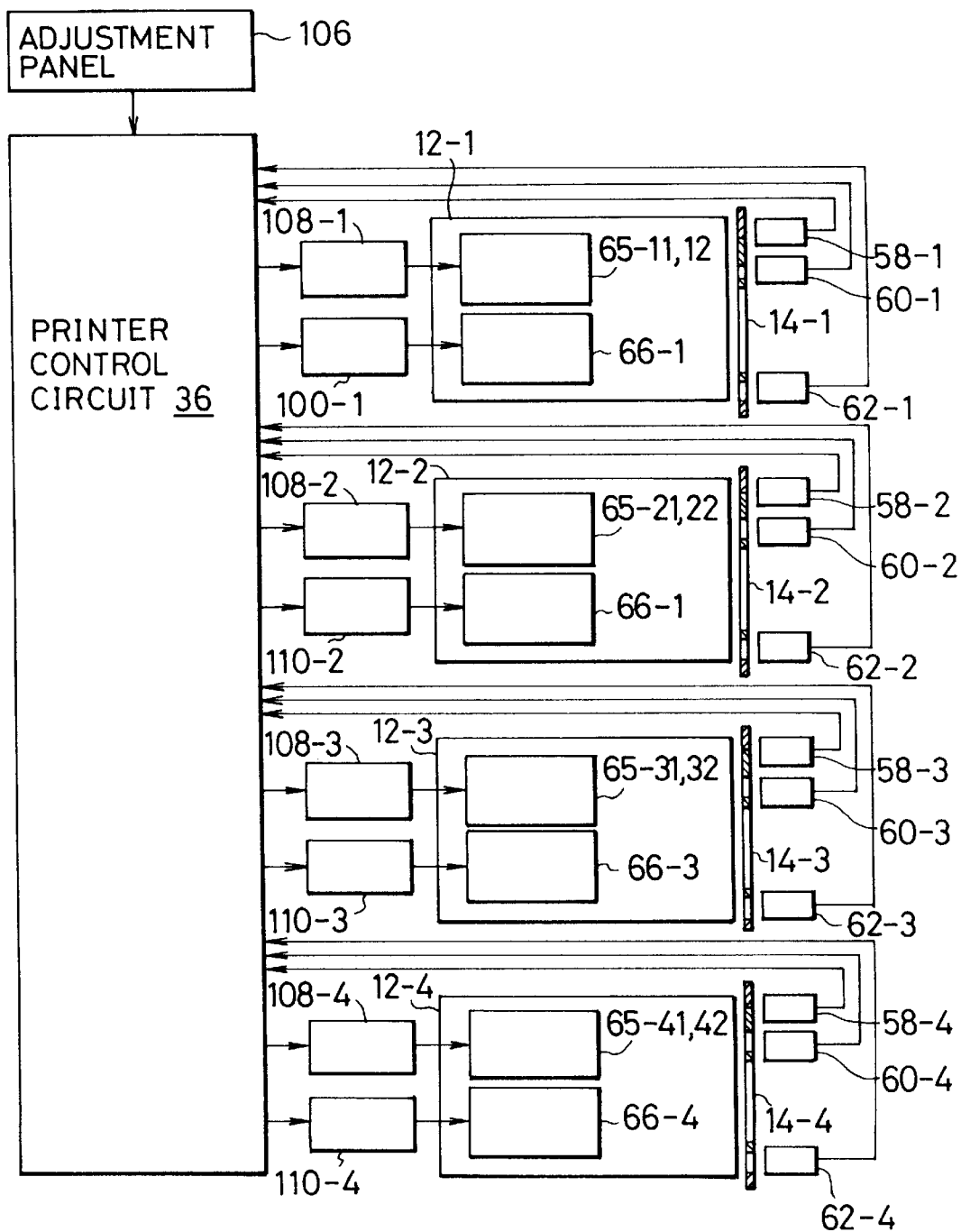
FIG. 8 is a block diagram of the printer circuit unit of the present invention.

FIG. 8 is a circuit block diagram for detecting and correcting a positional shift of a scanning beam in the color printer of the present invention. Detection signals from the reference position sensors 58-1 to 58-4 and the optical sensors 60-1 to 60-4 and 62-1 to 62-4 provided in the mask plate 14 corresponding to the four optical beam scanning units 12-1 to 12-4 are entered into the printer control circuit 36. In FIG. 8, the mask plate 14 is shown in the form of sections cut at positions of scanning loci of the individual optical beam scanning units.

The optical beam scanning units 12-1 to 12-4 are provided with respective laser position driving mechanisms 65-11 and 12 to 65-41 and 42 as correction driving mechanisms and mirror rotating mechanisms 66-1 to 66-4. Drivers 108-1 to 108-4 and 110-1 to 110-4 corresponding to these correction driving mechanisms are provided.

Figure 9:
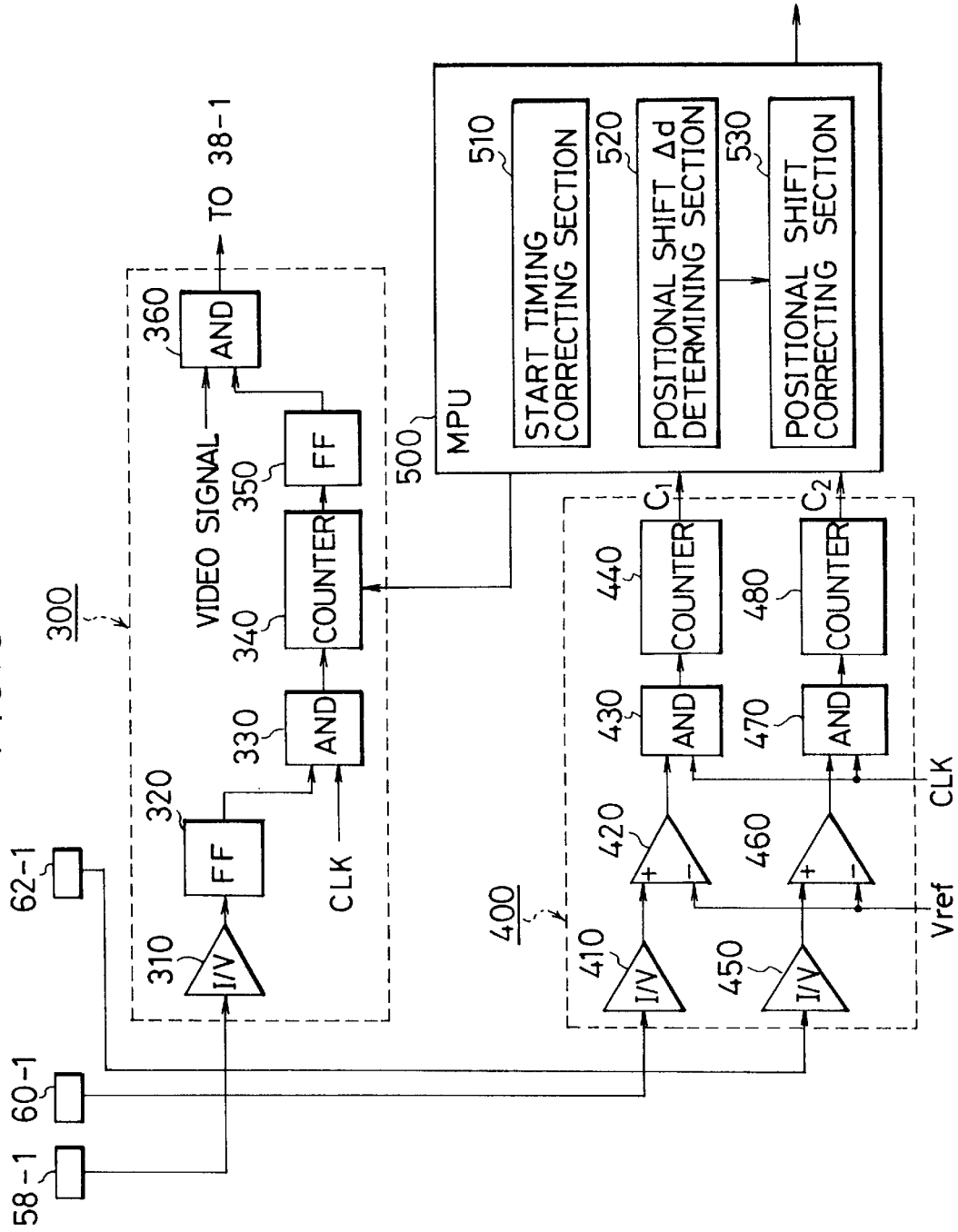
FIG. 9 is a block diagram of the circuit section for a single optical unit provided in the printer control section shown in FIG. 8.

FIG. 9 shows a circuit section, corresponding to the uppermost optical beam scanning unit 12-1, provided in the printer control circuit 36 in FIG. 8. The reference position detection signal from the reference position sensor 58-1 is entered into a start timing control circuit 300. More specifically, the reference position detection signal is amplified by an amplifier 310, and at the same time, detection current is converted into a voltage signal which sets a flip-flop 320 upon rise-up to level-H. Setting of the flip-flop 320 causes an AND-gate to become enabled, and enters clock pulses CLK into the counter 340. A count value corresponding to the scanning time T from the reference position to the beam scanning start position is preset in the counter 340 by an MPU 500. When the counter 340 begins the counting of clock pulses and the present value is reached, an overflow output is produced and another flip-flop 350 is set. Setting of this flip-flop 350 makes an AND-gate 360 enabled: a video signal is supplied to the laser diode 38-1 to start beam scanning by laser beam emission.

The detection signals from the optical sensors 60-1 and 62-1 provided to correspond to the triangular detection windows of the mask plate are entered into a positional shift detecting section 400. The two detection signals are amplified by amplifiers 410 and 450, and simultaneously converted into voltage signals, which are entered into comparators 420 and 460 and waveform-adjusted into detection signals having a pulse width equal to the excess over the reference voltage Vref. When the level of output from the comparators 420 and 460 is increased to level-H, each AND-gate is respectively enabled, and clock pulses CLK are supplied as output to the counters 440 and 480. The counter 440 counts the time width C1 of the detection signal on the start end side. The counter 480 counts the time width C2 of the detection signal on the terminal end side. The count values C1 and C2 made available by the counters 440 and 480 are supplied to an MPU 500. The MPU 500 is provided with a positional shift determining section 520 and a correcting section 530 as functions based on program control to correspond to the positional shift detecting section 400.

The positional shift determining section 520 determines parallelism of the scanning loci, the degree of inclination and the direction of inclination from the time width of detection signals between the start end side and the terminal end side, as shown in FIGS. 6A to 6D, for example, in terms of comparative judgement of the count values C1 and C2 of the counters 440 and 480 and the difference therebetween ΔC (=C1−C2), and supplies the result to the positional shift correcting section 530 as positional shift detection information. For example, ΔC=0 means parallelism; a positive value of Δ suggests a left-up inclination; and a negative value of A, a right-up inclination.

The positional shift correcting section 530 corrects the positional shift through positional adjustment on a horizontal plane perpendicular to the optical axis of the semiconductor laser 38-1, or rotational adjustment of the galvanomirror 42-1, on the basis of the received positional shift detection information.

The MPU 500 is provided with a start timing correcting section 510 for correcting the beam start position by the start timing control circuit section 300. The start timing correcting section 510 receives, upon input operation by the operator, for example, information corresponding to a shift of the beam start position of any of the four lines at a printing test for adjustment, and makes a correction, so as to eliminate the shift of the start position, the preset value for the counter 340 provided in the start timing control section 300, i.e., the time from the reference position to the beam scanning start position.

The printer control circuit 36 shown in FIG. 8 is provided with an adjustment panel 106. The adjustment panel 106 is used, for example, during manufacture in the factory, or upon replacement of optical beam scanning units the user, and is built in the main body of the apparatus. In the present invention, correction of a positional shift of the scanning beam can be accomplished for each optical beam scanning unit by the operator giving necessary instructions to the printer control circuit 36 with the use of the adjustment panel 106.

Figure 10:
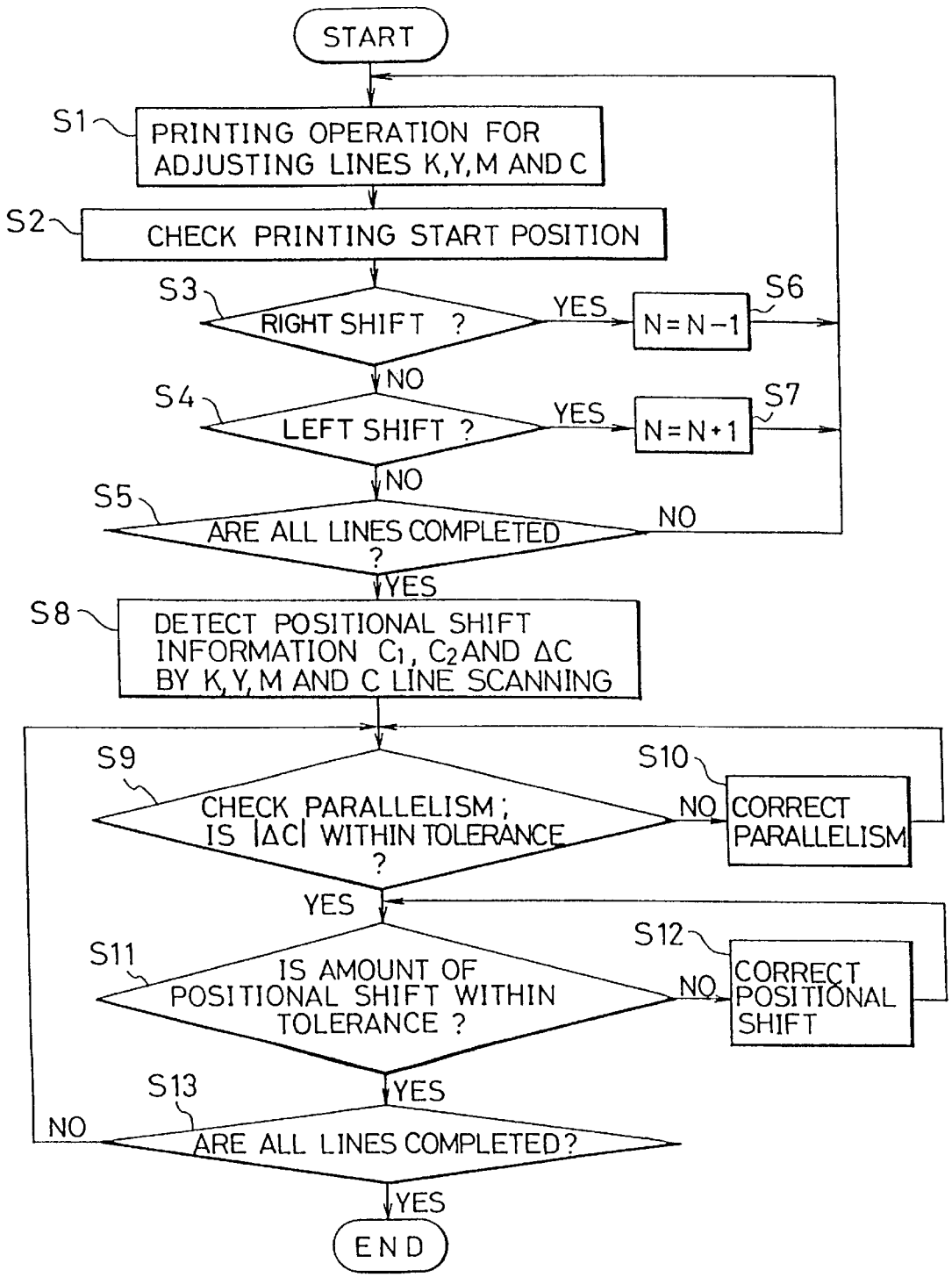
FIG. 10 is a flow chart of positional shift correction of the present invention.

The flow chart of FIG. 10 covers positional shift detecting and correcting operations in the present invention. Steps Si to S5 are for correcting the start timing of the scanning beam, and the remaining Steps S8 to S12 are for correcting the positional shift of the scanning beam. In adjusting the start timing, each of the lines Y, M, C and K is caused to perform a printing operation for adjustment at Step S1. This printing operation can be made by an instruction of the operator from the adjustment panel 106 shown in FIG. 8.

Figure 11A:
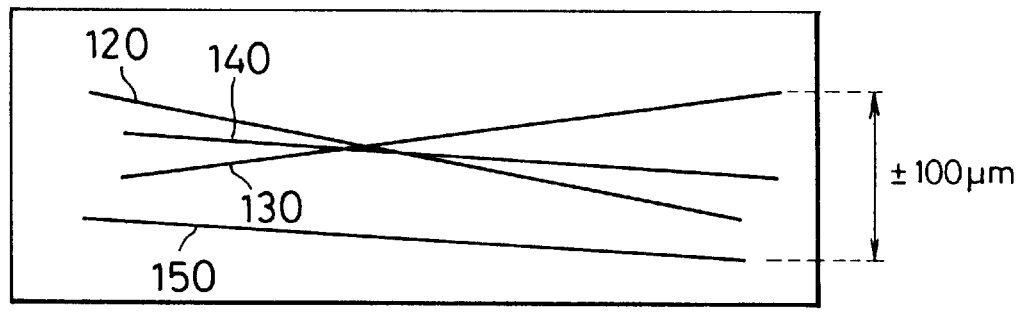
FIGS. 11A to 11C are descriptive views of a positional shift and a correction thereof of a scanning line.

Assume that scanning lines 120, 130, 140 and 150 corresponding to the individual color components Y, M, C and K are obtained as shown in FIG. 11A by the adjustment printing operation at Step S1. Assume further that, because of incomplete adjustment of the four optical beam scanning units, the scanning start positions for the scanning lines 130 and 140 shift to the right, although the scanning start positions of the scanning lines 120 and 150 are correct. In a direction perpendicular to there is scanning lines, the a positional shift of up to 35 100 μm between the scanning lines 120, 130, 140 and 150. Under such circumstances, adjustment of the scanning start timing is conducted at Steps S2 to S5. First, the printing start position is checked at Step S2. If a result of adjustment printing as shown in FIG. 11A is obtained, for example, the operator checks the printing result, and sets any of normal, left shift and right shift to the adjustment routine performed sequentially from the scanning lines 120 to 150. Once the operator sets information about the shift in beam start position, subsequent adjustment is accomplished automatically.

Figure 11B:
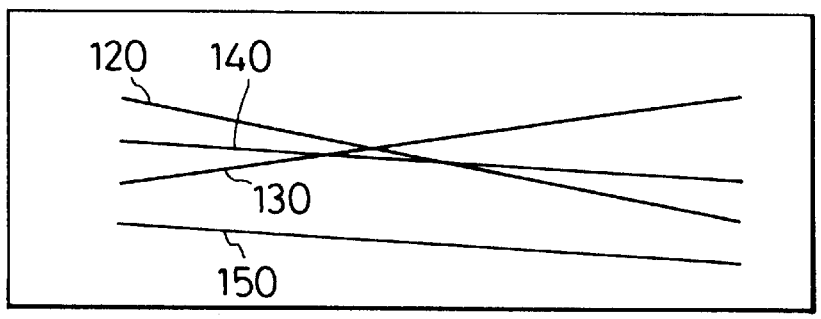

For the scanning line 120, the first object of control which is at the correct position, no particular adjustment is made, the flow of processing proceeding through Steps S3, S4 and S5, and then back to Step S2. For the scanning line 130 which shows a right shift, the right shift is determined at Step S3; then at Step S6, the preset value N is reduced by one in the counter 340 provided in the start timing control circuit 300 shown in FIG. 9; and then an adjustment printing operation is performed again at Step S1. A routine comprising these Steps S1 to S3 and S6 is repeated until the position is corrected to the proper one as indicated by the scanning line 130 in FIG. 11B. Similarly for the scanning line 140, the right shift is corrected by repeating the operations of Steps S1 to S3 and S6. For the final scanning line 150, being at the normal position, no adjustment is made. The positional shift adjustment for aligning the start positions of the scanning lines shown in FIG. 11B is thus completed.

Figure 11C:
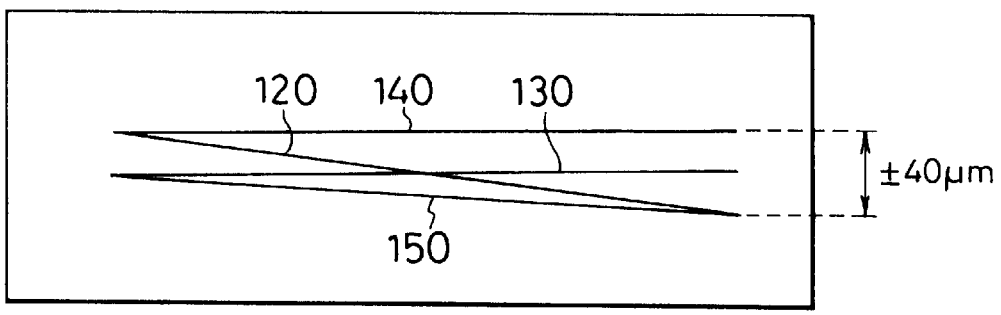

Then, the positional shift correcting operations shown in Steps S8 to S11 are carried out. First, in the state in which the beam start position has been adjusted at Step S8, beam scanning is performed for each of Y, M, C and K to obtain detection information available at the positional shift detecting circuit section 400 shown in FIG. 9 on the basis of the signals from the optical sensors 60-1 to 60-4, and 62-1 to 62-4 provided in the mask plate 14, i.e., count values C1 and C2 of the counters 440 and 480 and the difference ΔC between C1 and C2. Assume, for example, that the scanning result shown in FIG. 11B has been obtained: the scanning lines 120, 140 and 150 show a left-up inclination, and the scanning line 130 has a right-up inclination. While the scanning lines 140 and 150 have almost the same inclinations, the scanning line 120 has a steeper inclination. Correcting operations of Steps S9 to S13 are therefore effected in the order of the scanning lines 120, 130, 140 and then 150. First at Step S9, parallelism is checked up. For example, it is checked up whether or not the value of ΔC is within a predetermined range of tolerance. If within this allowable range, the processing proceeds to Step S11. If the value of ΔC is over the allowable range, the position of the laser diode is adjusted in the direction of reducing the inclination of the scanning line at Step S10, and the galvano-mirror is rotated. When parallelism is confirmed with a ΔC value within the tolerable range at Step S9, and it is checked up whether or not the amount of shift of the scanning line is within the allowable range at step S11. The scanning loci passing through the centers of triangles of the detection windows 54-1 to 54-4 and 56-1 to 56-4 provided in the mask plate 14 in FIG. 5 are used as reference loci, and the counter value at this point is previously determined as the reference value Cref. The detected values C1 and C2 are compared with this reference value Cref to determine whether or not the differences are within the allowable range. If within the allowable range, a positional shift is considered to be non-existent, a check is made whether all the scanning lines have been completed as Step S13 and, if not, correcting operations of the next scanning line are started at Step S13. If the allowable value is exceeded, the position of the laser diode is adjusted at Step S13 so as to reduce the positional shift of the scanning line keeping parallelism, and the galvano-mirror is rotated. By applying these correcting operations of Steps S9 to S12 to the scanning lines 120, 130, 140 and 150 of FIG. 11B, it is possible to correct a positional shift so as to make an adjustment within ±40 μm relative to the reference scanning line as shown in FIG. 11C.

Upon processing shown in FIG. 10, the operator views the scanning line pattern printed for adjustment at Step S1 to detect the scanning start position. As the main body 10 has a scanner unit 34 as shown in FIG. 1, it is possible to achieve automatic correction by setting a sheet of paper for adjustment printing on the scanner unit 34, causing the image processing unit 35 to read in, detecting the scanning line start position at the image processing unit 35, and giving the result of detection to the MPU 500 of the printer control section 36. The positional correction at Steps S8 to S13 is carried out in the sequence from correction of parallelism and then correction of positional shift. Parallelism may however be checked again after positional shift correction. When an automatically corrected value is not within the allowable range, then operator may manually make a rough adjustment, and the repeat processing for automatic correction.

Figure 12:
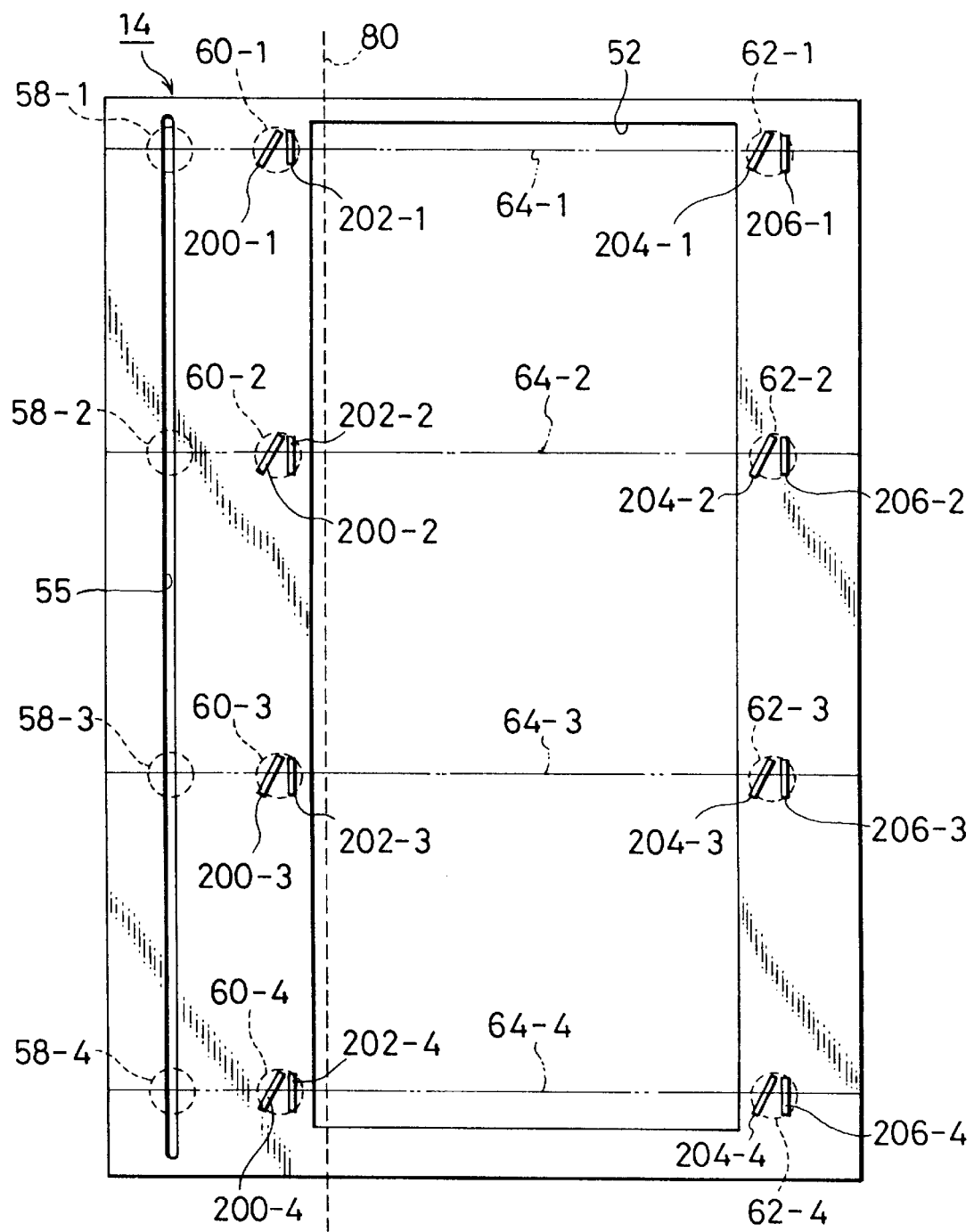
FIG. 12 is a descriptive view of another embodiment of the mask plate used in the present invention.

FIG. 12 shows another embodiment of the mask plate of the present invention. This embodiment is characterized in that a pair of slits, at least one of which has an inclination relative to the direction of the scanning locus, are provided in place of the triangular detection windows. Taking the scanning locus 64-1 as an example, an inclined slit 200-1 and a vertical slit 202-1 are formed on the start end side, and similarly, an inclined slit 204-1 and a vertical slit 206-1 are formed on the terminal end side.

Figure 13A:
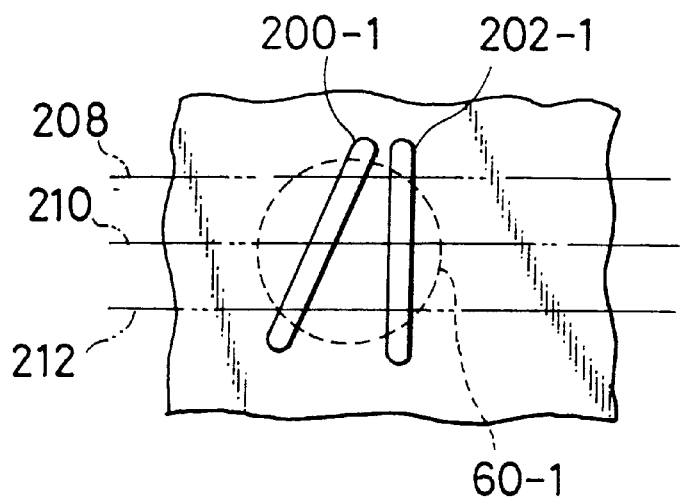
FIGS. 13A to 13D are descriptive views of the detection signal caused by a difference in position between the detecting window and the scanning locus of FIG. 12.
Figure 13B:
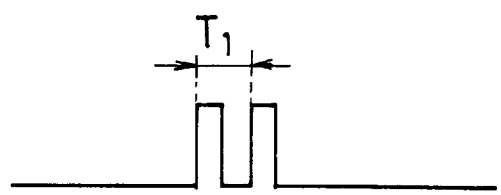
Figure 13C:
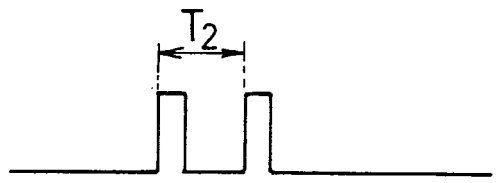
Figure 13D:
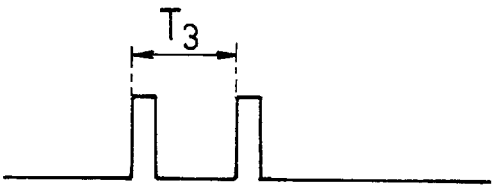

FIG. 13A shows the inclined slit 200-1 and the vertical slit 202-1 on the start end side: when the scanning locus changes to 208, 210 and 212 as shown in FIG. 13A, there are available different detection signals as shown in FIGS. 13B, 13C and 13D from the optical sensor 60-1. More specifically, the detection signal of FIG. 13B for the uppermost scanning locus 208 shown in FIG. 13A has, for example, a short rise-up time width T1 for the detection signal of the inclined slit 200-1 and the detection signal of the next vertical slit 202-1. In the case of FIGS. 13C and 13D showing the second scanning locus 210 and the third scanning locus 212, in contrast, the widening distance between slits at the portion of passage of the scanning locus results in increased rise-up time widths shown as T2 and T3.

Results of detection of parallelism, direction of shift and amount of shift are therefore available as in the case of the triangular detecting window of FIG. 2. The detecting window may be trapezoidal or the triangle shown in FIG. 2 may be turned upward. Although the start end side has an inclined slit and the terminal end side has a vertical slit in the embodiment shown in FIG. 12, the right and the left slits may be switched. An upward-opening slit may be used. Further, two slits may be provided along the sides of the triangle.

According to the present invention, as described above, it is possible to facilitate printing positioning requiring mechanical adjustment and reduce the cost required for scanning line positioning adjustment in the manufacturing stage of a color printer. Upon failure of an optical beam scanning unit, furthermore, it is possible to replace each unit separately, and to easily accomplish positional shift correction of scanning lines in such replacement, thus permitting easier maintenance operations and a running cost reduction.

While a tandem type color printer based on YMCK system, in which an optical beam scanning unit and a photosensitive drum are independently provided for each color component has been described in the above-mentioned embodiments, the present invention is not limited to such a configuration, but is directly applicable to any color printer which has a plurality of optical beam scanning units and a plurality of photosensitive drums.

What is claimed is:

1. A color printer for transcribing developed images on a sheet of paper, the color printer comprising:

a plurality of photosensitive drums;

a plurality of electrophotography units which are arranged at predetermined intervals in a conveying direction of the sheet of paper and which develop latent images formed on said plurality of photosensitive drums by an optical scan using toner, and then sequentially transcribe the developed images at same relative positions on the sheet of paper that is conveyed;

a plurality of optical beam scanning units, each having a laser source and are releasable and replaceable, which are arranged so as to be opposite to corresponding ones of said plurality of photosensitive drums and which image light beams from respective ones of said plurality of laser sources onto the corresponding ones of said plurality of photosensitive drums to conduct linear beam scanning of the light beams;

a mask plate, provided with a beam transmission window, fixedly arranged between said plurality of optical beam scanning units and the photosensitive drums;

a plurality of detecting windows which are provided in said mask plate, each having a slanted edge relative to a direction substantially normal to the linear beam scanning direction and respectively formed at each of a start end side and a terminal end side of the mask plate for each scanning locus of said plurality of optical beam scanning units, and in which a beam transmission time varies with a change in a beam scanning position;

a plurality of optical sensors, respectively installed behind said plurality of detecting windows, to generate detection signals in response to the beam transmission time resulting from the linear beam scanning;

a determination circuit which determines a direction and an amount of a positional shift of each scanning locus based on the detection signals from the optical sensors at the start end side and the terminal end side of the mask plate for said each scanning locus, to provide an output of a positional shift detection signal during positional adjustment after replacing at least any one of said plurality of optical beam scanning units; and a positional shift correcting circuit which corrects a positional shift of the scanning locus, upon receipt of the positional shift detection signal from said determination circuit, by changing the direction and the position of one of the light beams from the laser source of each of said plurality of optical beam scanning units which is replaced.

2. The printer according to claim 1, wherein each of said plurality of detecting windows of said mask plate has a triangular shape.

3. The printer according to claim 1, wherein each of said plurality of detecting windows of said mask plate has a trapezoidal shape.

4. The printer according to claim 1, wherein each of said plurality of detecting windows of said mask plate is a pair of slits, wherein at least one of said pair of slits is arranged at an angle greater than 0° relative to the corresponding scanning locus.

5. The printer according to claim 4, wherein said positional shift correcting circuit comprises pairs of driving sources arranged on planes normal to optical axes of said laser sources, said pairs of driving sources shifting positions of the corresponding laser sources on the corresponding normal planes, thereby shifting in parallel the corresponding light beams.

6. The printer according to claim 1, wherein said positional shift correcting circuit comprises pairs, of a mirror and a mirror rotation mechanism, respectively provided in a middle of each optical path from said laser sources to said corresponding photosensitive drums, and mirror rotations caused by said mirror rotation mechanisms change the direction of the respective light beams from said laser sources.

7. The printer according to claim 6, wherein each of said mirror rotating mechanisms is a piezo-electric element, and the respective mirror is rotated by a displacement produced by applying an electric signal to said respective piezo-electric element.

8. The printer according to claim 1, further comprising:

a reference window, provided before said plurality of detecting windows on the start end side of said mask plate, for detecting reference positions for starting scanning of each of the light beams;

reference position sensors which issue respective reference position signals upon receipt of the respective light beams passing through said reference window; and a start timing control circuit to begin supplying respective drive signals to said respective laser sources upon a lapse of a set period of time after obtaining said respective reference position signals; and said positional shift correcting circuit corrects each scanning start timing by changing the set period of time of said start timing control circuit.

9. The printer according to claim 8, wherein said reference window of said mask plate is a slit formed in a direction substantially normal to the linear beam scanning loci.

10. The printer according to claim 1, wherein said plurality of optical beam scanning units are releasably provided as units independent of said plurality of photosensitive drums and said mask plate.

11. The color printer according to claim 1, further comprising:

a reference slit which is formed before each of the detecting windows on the start end side of said mask plate and sets a reference position at right angles to the beam scanning direction;

a plurality of reference position sensors provided for each individual beam unit position, which are arranged behind said slit and provide detection signals of a transmitted light resulting from beam scanning;

a start timing control unit which starts a counting operation in response to a reference position detection signal of said reference position sensors and starts beam scanning at a prescribed count of a preset value; and a start timing correcting unit which causes printing of a plurality of lines onto a form by controlling beam scanning of said plurality of scanning optical units by said start timing control unit, and corrects the preset value for each beam of said start timing control unit so that the individual lines start at a predetermined start position.

* * * * *

UNITED STATES PATENT AND TRADEMARK OFFICE
CERTIFICATE OF CORRECTION

PATENT NO.: 5,982,402
DATED : November 9, 1999
INVENTOR(S): Hiroyasu YOSHIKAWA, et al.

It is certified that error appears in the above-identified patent and that said Letters Patent is hereby corrected as shown below:

ON THE TITLE PAGE:

[30] Foreign Application Priority Data
change "May 27, 1997" to --December 14, 1993--.

Signed and Sealed this

Ninth Day of May, 2000

*Attest:*

Q. TODD DICKINSON

*Attesting Officer*  *Director of Patents and Trademarks*